Patented Apr. 20, 1937

2,077,399

UNITED STATES PATENT OFFICE 2,077,399

MOISTUREPROOF FILMS

Arnold M. Collins and Louis L. Larson, Wilmington, Del., assignors, by mesne assignments, to E. I. du Pont de Nemours & Company, Wilmington, Del., a corporation of Delaware No Drawing. Application July 23, 1934, Serial No. 736,618

7 Claims. (Cl. 91—68)

This invention relates to moistureproofing compositions, moistureproof materials, and to the method of preparing moistureproof materials.

This application is a continuation-in-part of our co-pending application, Serial No. 572,727 filed November 2, 1931, now Patent 1,967,863.

Cellulosic films, particularly regenerated cellulose film, have long been known and used commercially, but it is only within recent years that such materials have acquired a widespread and extensive use as a wrapping tissue. This widespread use of cellulosic films is due to the recent invention of cellulosic films having a moistureproof coating thereon. By reason of this moistureproof characteristic of films made from cellulosic materials, various substances and articles wrapped therein, will maintain their original fresh state without appreciable change in the moisture content thereof, and because of their natural transparency, moistureproof cellulosic materials are particularly desirable as wrapping tissue.

It has now been found that particularly favorable moistureproofing results can be secured by coating films, such as regenerated cellulose, with a composition containing polymerized halogen-2-butadiene-1,3, particularly chloro-2-butadiene-1,3 polymer in combination with a moisture-1,3 proofing ingredient. Coating compositions prepared in accordance with this invention preferably contain other modifying constituents such as will be described hereinafter.

One object of the present invention comprises the provision of materials which have been modified by treatment with a halogen-2-butadiene-1,3 polymer. A further object of this invention comprises the method of treatment of a cellulosic base with solutions or dispersions of halogen-2-butadiene-1,3 polymer. A still further object of this invention comprises the production of a new transparent, flexible, moistureproof regenerated cellulose wrapping tissue. Other objects of the invention will appear hereinafter.

The objects of the present invention are accomplished in general by applying to a cellulosic sheet or film, for example, regenerated cellulose, a coating composition containing a film-forming material, for example pyroxylin, and a moistureproofing material, for example a wax, a plasticizer, and a polymerized halogen-2-butadiene-1,3, particularly chloro-2-butadiene-1,3 polymer. This composition is applied to the cellulosic sheet or film and after removal of the excess composition is subjected to a temperature equal to the melting or crystallization point of the wax in the composition. When the base material is of the type which loses more or less of its moisture or is dehydrated during some stage of the process and consequently becomes more or less brittle, the invention further contemplates submitting the dried coated material to a humidifying treatment, preferably carried out at an elevated temperature sufficiently high so that the coating will lose a portion of its impermeability, thereby allowing moisture from the surrounding atmosphere to diffuse through the coating into the inner base which is thus softened.

A coating composition may be applied to the base in any desirable manner, such as by passing the base through a bath containing the same, or by spraying the coating composition thereon, or the like. After the application of the composition, the excess thereof may be removed in any convenient manner. In the case where beads of the coating composition are formed on the longitudinal edges of the base, they may be removed by utilizing the apparatus described in U. S. Patent Serial No. 1,826,697.

The coated film is then introduced into an appropriate dryer, such as a chamber through which air is circulated, where it is dried by the evaporation of the solvent. The temperature is rapidly increased until it reaches a point at least approximately equal to the melting point or crystallization point of the wax in the composition. Alternatively, the coated base may be first dried at some lower temperature and then subjected to a heat treatment at a temperature at least equal to the melting point or crystallization point of the wax in the composition.

In the preferred form of the invention, sheets or films of regenerated cellulose are contemplated as the base. However, paper and other cellulosic materials, especially those which are non-fibrous, non-porous, and preferably transparent, such as treated paper, sheets or films of cellulose derivatives, materials coated with non-moistureproofing compositions, sheets or films of albuminous materials, such as gelatin, agar-agar, etc., are also contemplated.

In its simplest form, the moistureproofing composition contemplates a solution of a polymerized halogen-2-butadiene-1,3, particularly chloro-2-butadiene-1,3 polymer, and waxes in a common solvent. The coatings resulting from such a composition are usually more or less subject to marking when handled, particularly where the moistureproofing wax is soft wax, such as the lower melting varieties of paraffin or the softer varieties of ceresin wax. This may not be objectionable for certain uses but for a large number of purposes it is objectionable. Thus, the invention also contemplates overcoming this undesirable property and this is secured by introducing a substance which increases the hardness of the coat and more fully described hereafter, in the composition.

Various methods for producing polymerized chloro-2-butadiene-1,3 are described in Carothers and Collins U. S. Patents Nos. 1,950,432 and 1,950,433, Carothers, Collins and Kirby U. S. Patents Nos. 1,950,438 and 1,967,860, Carothers and Kirby U. S. Pat. No. 1,950,439, and in Williams U. S. Pat. No. 1,950,436.

Soluble chloro-2-butadiene-1,3 polymers, capable of use in accordance with the present invention, may be prepared as follows:

Example A.—Freshly distilled chloro-2-butadiene-1,3 is exposed in a closed glass bottle to a mercury vapor lamp operating in pyrex glass, for 48 to 72 hours at room temperature. Two per cent phenyl-beta-naphthylamine is added to the resulting viscous syrup and the unpolymerized chloro-2-butadiene-1,3 is removed by distillation in vacuo with vigorous mechanical stirring. The semi-solid chloro-2-butadiene-1,3 polymer remaining is then dissolved in toluene or xylene and used in the formulation of the moistureproof compositions.

In addition to the plastic polymer prepared in accordance with the above example, it will be understood that the other soluble polymers prepared according to the method disclosed in the Williams application referred to above may be substituted therefor.

Solutions of the plastic polymers prepared as described above may be made by dissolving the plastic polymers in suitable aromatic hydrocarbon or chlorinated aliphatic or aromatic hydrocarbon solvents such as benzene, toluene, xylene, carbon tetrachloride, chlorobenzene, etc. Esters such as ethyl acetate and butyl acetate may be used for the same purpose. Small amounts of aliphatic hydrocarbons and alcohols may also be used in the solvent mixture although they are themselves not solvents for the polymers. Polymer solutions suitable for the purposes of this invention may also be prepared by polymerizing chloro-2-butadiene-1,3 in the presence of a solvent as disclosed by Carothers, Collins and Kirby in U. S. Pat. No. 1,967,860.

As the moistureproofing ingredient, any wax or wax-like substance capable of moistureproofing may be used. The paraffins, and preferably the high melting paraffins, such as those melting over 50° C., or better 55° C., or still better approximately 60° C. or over, are preferred. Wax derivatives and other waxes or waxy materials, such as ceresin, Montan, palm wax, Japan wax, Chinese insect wax, spermaceti, tallow, beeswax or synthetic waxes, may be used. It is to be understood that the waxes or waxy substances may be used singly or combined, as desired.

As the solvent, an organic liquid is used in which both the wax and the chloro-2-butadiene-1,3 polymer are soluble. As illustrative examples may be mentioned toluene, benzene, xylene, or the like. It is advantageous to choose the solvent with reference to the wax used, particularly in regard to the boiling point of said solvent which should preferably be higher than the melting point of the wax. For example, when a wax having a melting point of 60° C. is used, a solvent, such as toluene, of a boiling point of 111° C., will give good results. Frequently, when the temperature of the coating is to be maintained at or above the melting point of the wax in the composition while the solvent is being evaporated, it is preferable to use a mixed solvent in which at least one of the components has a boiling point higher than the melting point of the wax. The term "solvent", therefore, as employed in this specification is intended to cover one or more solvents with or without diluents. In all cases, the solvent selected is of such a nature that it will not injure the base being coated.

As the substance which increases the hardness of the coating, a hard wax, such as Carnauba wax, Candelilla wax, etc, or a hard or soft resin or gum, either natural or synthetic, and including, for example, gum dammar, gum mastic, zinc resinate, glyptal resins, and coumarin resins, may be used. The hardening agents, of course, may be used either singly or in combination, as desired. The resins are preferably soluble in hydrocarbons, such as benzene, xylene, toluene, gasoline, etc., but it is, of course, obvious that other resins may be used which are soluble in other liquids dissolving the halogen-2-butadiene-1,3 polymer or waxes in question. Compositions wherein gums or resins are utilized deposit coatings which possess superior surface gloss and smooth characteristics.

The compositions may, of course, be modified in many ways without departing from the spirit of the invention. Pigments or pigment-like materials may be added to obtain various effects. Oil-soluble dyes may be added where a transparent colored coating is desired. The coating may be further modified by the addition of metallic soaps or other substances to the coating composition. Variegated effects can be secured by the use of powdered mica, fish scales, metallic salts, etc.

The relative proportions of the solid ingredients constituting the solution or coating may vary within wide limits depending on the specific materials used and/or the properties desired in the final product. Depending on the wax or wax mixture used and the properties of the coating desired, i. e. surface, flexibility, transparency, and the like, the amount of wax may range from a relatively small quantity, such as, for example, 1% to 2%, to a relatively high quantity, such as 80% or even 95%, based on the total solids. When gums or resins are employed in conjunction with the other component, there is also a wide range of compositions which will give satisfactory results. Where a hard resin is used, the chloro-2-butadiene-1,3 polymer acts as a softening agent, preventing cracking of the coating when the sheets are creased or folded. In any formulation it is possible to use larger quantities of a soft gum, without introducing brittleness, as compared to the quantity of hard gum.

When compositions of the type previously described are applied in thin layers to bases also of the type previously described, there results a product which is highly moistureproof and flexible. When the coating is a few ten thousandths of an inch in thickness more or less, it still gives the desired moistureproof effects and is transparent. Thus, when the base is a transparent material, such as sheets or films of regenerated cellulose, the product is also transparent. Usually rather thick coatings will not yield perfect optical transparency, but it is unnecessary to apply such quantities of materials on the base to secure an acceptable product as regards both moistureproofness and transparency. Due to the hardening agent, the material does not smear on handling and possesses the desirable slip surface. The material, when used as a wrapper, can be heat sealed. By virtue of the fact that the solid ingredients and the solvents are cheaper than those formerly used in moistureproofing compositions, the product is more economical than that which has been heretofore produced.

In order to more clearly explain the nature of the invention, the following illustrative, non-restrictive and specific embodiments are set forth; the chloro-2-butadiene-1,3 polymer in these examples is of the same character as that described in Example A above.

Example I

| | Parts |
|---|---|
| Chloro-2-butadiene-1,3 polymer | 5 |
| High melting paraffin | 6.25 |

Dissolve in toluene to give a 2% to 10% solution. Coat regenerated cellulose film and transfer at once to a drier at 80–90° C. and dry.

The coating is transparent, flexible and moistureproof.

Example II

| | Parts |
|---|---|
| Chloro-2-butadiene-1,3 polymer | 5 |
| High melting paraffin | 5 |
| Carnauba wax | 5 |

Dissolve, coat, and dry as in Example I.

Example III

| | Parts |
|---|---|
| Chloro-2-butadiene-1,3 polymer | 5 |
| High melting paraffin | 50 |

Dissolve, coat, and dry as in Example I.

Example IV

| | Parts |
|---|---|
| Chloro-2-butadiene-1,3 polymer | 5 |
| High melting paraffin | 15 |
| Carnauba wax | 15 |

Dissolve, coat, and dry as in Example I.

Example V

| | Parts |
|---|---|
| Chloro-2-butadiene-1,3 polymer | 5 |
| Ceresin wax | 10 |

Dissolve, coat, and dry as in Example I.

Example VI

| | Parts |
|---|---|
| Chloro-2-butadiene-1,3 polymer | 10 |
| Wax | 1 |

Dissolve, coat, and dry as in Example I.

Example VII

| | Parts |
|---|---|
| Chloro-2-butadiene-1,3 polymer | 5 |
| High melting paraffin | 100 |
| Gum dammar | 10 |

Dissolve, coat, and dry as in Example I.

Example VIII

| | Parts |
|---|---|
| Chloro-2-butadiene-1,3 polymer | 5 |
| High melting paraffin | 15 |
| Gum dammar | 10 |

Dissolve, coat, and dry as in Example I.

Example IX

| | Parts |
|---|---|
| Chloro-2-butadiene-1,3 polymer | 5 |
| High melting paraffin | 5 |
| Vinyl chloride-vinyl acetate resin | 5 |

Dissolve, coat, and dry as in Example I.

Example X

The following ingredients in approximately the proportions set forth are dissolved in 1,000 parts by weight of a solvent composed of 60% toluene and 40% amyl acetate:

| | Parts by weight |
|---|---|
| Chloro-2-butadiene-1,3 polymer | 7 |
| Pyroxylin (51 seconds) | 10 |
| Paraffin (M. P. 60–62° C.) | 60 |
| Refined carnauba wax | 13 |

A sheet of regenerated cellulose is coated, dried and humidified as previously described.

Example XI

A sufficient quantity of the following ingredients in the proportions set forth is dissolved in a mixture of 60% toluene and 40% amyl acetate to give a solution containing 10% solids:

| | Parts by weight |
|---|---|
| Chloro-2-butadiene-1,3 polymer | 9 |
| Pyroxylin (51 seconds) | 72 |
| Paraffin (M. P. 60–62° C.) | 9 |
| Tricresyl phosphate | 10 |

The process of coating, drying and humidifying is the same as in Example X.

The coatings of Examples II to XI inclusive, similarly to that of Example I, are flexible, transparent and moistureproof.

For the purposes of this specification and claims, we define "moistureproof" materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98% and the relative humidity of the atmosphere at the other side being maintained at such a value as to give a humidity differential of at least 95%.

Moistureproof coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.25° C.), with a water vapor pressure differential of 50–55 mm. (preferably 53.4 plus or minus 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

In Example A above, in place of phenyl-beta-naphthylamine, which has been used as a polymerization inhibitor or stabilizer, various other compounds having a like property, for example, those substances which are disclosed in Carothers, Collins and Kirby Patent No. 1,950,438 referred to above, may be substituted.

Any variation or modification of the examples and the conditions disclosed in the above description, which conforms to the spirit of the invention, is intended to be included within the scope of the claims.

Claims:

1. A transparent, flexible, moistureproof, non-porous, non-fibrous cellulosic film coated with a moistureproofing composition containing chloro-2-butadiene-1,3 polymer and a wax material present in said composition in such an amount as to impart moistureproofness to the film.

2. A transparent, flexible, moistureproof regenerated cellulose film coated with a moistureproofing composition containing chloro-2-butadiene-1,3 polymer and a wax material present in said composition in such an amount as to impart moistureproofness to the film.

3. A flexible, moistureproof, non-fibrous, non-porous cellulosic film coated with a moistureproofing composition containing chloro-2-butadiene-1,3 polymer and a wax material present in said composition in such an amount as to impart moistureproofness to the film.

4. A flexible, moistureproof, non-fibrous, non-porous cellulosic film coated with a moistureproofing composition containing a halogen-2-butadiene-1,3 polymer and a wax material present in said composition in such an amount as to impart moistureproofness to the film.

5. A transparent, flexible, moistureproof, non-porous, non-fibrous cellulosic film coated with a moistureproofing composition containing chloro-2-butadiene-1,3 polymer, a film forming agent and a wax material in such an amount as to impart moistureproofness to the film.

6. A transparent, flexible, moistureproof, non-porous, non-fibrous cellulosic film coated with a moistureproofing composition containing chloro-2-butadiene-1,3 polymer, a cellulose derivative and a wax material in such an amount as to impart moistureproofness to the film.

7. A moistureproofing composition consisting of chloro-2-butadiene-1,3 polymer, a wax and a solvent, said wax being present in such an amount as to impart moistureproofness to a film coated with said composition.

ARNOLD M. COLLINS.
LOUIS L. LARSON.